US012521292B2

(12) United States Patent
Knapp

(10) Patent No.: US 12,521,292 B2
(45) Date of Patent: Jan. 13, 2026

(54) MASSAGE TABLE COVER

(71) Applicant: Christine Marie Knapp, Los Angeles, CA (US)

(72) Inventor: Christine Marie Knapp, Los Angeles, CA (US)

( * ) Notice: Subject to any disclaimer, the term of this patent is extended or adjusted under 35 U.S.C. 154(b) by 852 days.

(21) Appl. No.: 17/865,894

(22) Filed: Jul. 15, 2022

(65) Prior Publication Data

US 2024/0016685 A1 Jan. 18, 2024

(51) Int. Cl.
*A61G 10/00* (2006.01)
*A61G 13/00* (2006.01)
*A61G 13/10* (2006.01)

(52) U.S. Cl.
CPC ......... *A61G 10/005* (2013.01); *A61G 13/009* (2013.01); *A61G 13/105* (2013.01)

(58) Field of Classification Search
CPC .... A61G 13/009; A61G 13/105; A61G 13/10; A61G 13/005; A47B 3/00; A47B 3/087
See application file for complete search history.

(56) References Cited

U.S. PATENT DOCUMENTS

| | | | | | |
|---|---|---|---|---|---|
| 4,993,092 | A * | 2/1991 | Weeks | A61G 1/01 | D24/190 |
| 5,133,097 | A * | 7/1992 | Pyles | A61B 46/00 | 297/227 |
| 7,120,952 | B1 * | 10/2006 | Bass | A47C 31/105 | 5/500 |
| 2007/0251430 | A1 * | 11/2007 | McDowell | A61G 13/009 | 108/90 |
| 2010/0299835 | A1 * | 12/2010 | Andrews | A61G 13/009 | 5/622 |
| 2011/0047705 | A1 * | 3/2011 | Gorovitz | A61G 13/009 | 5/613 |
| 2011/0247612 | A1 * | 10/2011 | DeSalvo | A61M 16/101 | 128/200.23 |

* cited by examiner

*Primary Examiner* — Fredrick C Conley
(74) *Attorney, Agent, or Firm* — Michael M. Ahmadshahi

(57) ABSTRACT

A massage table cover includes a rectangular top portion, four rectangular side portions, and two elastics, operable to cover one section of a foldable massage table. The rectangular front portion includes an opening which receives the handle of the foldable massage table. The massage table cover further includes a rectangular rear reinforcement portion which is coupled with the rectangular rear portion operable to protect the cover when the massage table makes contact with the ground. The cover may further include an opening maintenance portion, a fastener, and a flap.

11 Claims, 5 Drawing Sheets

MASSAGE TABLE COVER

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to a massage table cover. The cover comprises a top portion, four side portions, and two elastics, operable to cover one section of a foldable massage table. The front portion includes an aperture, operable to receive a handle of the foldable massage table. The cover further includes a rear reinforcement portion which is coupled with the rear portion.

BACKGROUND

Conventional massage table covers fail to remain coupled with the foldable message table when the latter is folded. In addition, they lack means for receiving the massage table handle. Furthermore, they lack reinforcements on the rear portion where the massage table makes contact with the ground. Therefore, there is a need for a massage table cover which remains intact when the massage table is folded, provide means to receive the massage table handle, and protect against wear when making contact with the ground.

SUMMARY

In one aspect, a massage table cover for covering one section of a foldable massage table is disclosed wherein the cover comprises a rectangular top portion operable to cover a rectangular top surface of the one section of the foldable massage table, a rectangular front portion operable to cover a rectangular front surface of the one section of the foldable massage table, said rectangular front portion comprising an aperture, said aperture operable to receive a handle of the foldable massage table, a rectangular rear portion operable to cover a rectangular rear surface of the one section of the foldable massage table, a rectangular left portion operable to cover a rectangular left surface of the one section of the foldable massage table, a rectangular right portion operable to cover a rectangular right surface of the one section of the foldable massage table, a rectangular rear reinforcement portion coupled with the rectangular rear portion, a front elastic embedded within an edge of the rectangular front portion and extending through a partial length of the rectangular front portion, and a rear elastic embedded within an edge of the rectangular rear portion and extending through a partial length of the rectangular rear portion, wherein the front elastic and the rear elastic operate to secure the massage table cover to the one section of the foldable massage table, and wherein the rectangular rear reinforcement portion operates to protect the rectangular rear portion.

Preferably, at least one of the rectangular top portion, the rectangular front portion, the rectangular rear portion, the rectangular left portion, the rectangular right portion, and the rectangular rear reinforcement portion is made from fabric.

Preferably, at least one of the front elastic and the rear elastic is made from rubber.

Preferably, the aperture is rectangular.

Preferably, the rectangular rear reinforcement portion is coupled with the rectangular rear portion via stitches.

Preferably, the front elastic extends through a partial length of the rectangular left portion and further along an entire length of the rectangular front portion and further along a partial length of the rectangular right portion, and wherein the rear elastic extends through a partial length of the rectangular left portion and further along an entire length of the rectangular rear portion and further along a partial length of the rectangular right portion.

Preferably, the cover further comprises an aperture maintenance portion disposed around the aperture and coupled with the rectangular front portion, said aperture maintenance portion operable to maintain open the aperture.

Preferably, the aperture maintenance portion is made from leather.

Preferably, the aperture maintenance portion is rectangular.

Preferably, the aperture maintenance portion is coupled with the rectangular front portion via stitches.

Preferably, the cover further comprises a fastener coupled with a bottom side of the aperture maintenance portion, and a flap coupled with the top side of the aperture maintenance portion, said flap slidably disposed under the handle and operable to engage the fastener thereby further securing the massage table cover to the one section of the foldable massage table.

Preferably, the fastener is one of a button, a Velcro strap, and a snap button.

In another aspect, a method of covering one section of a foldable massage table is disclosed wherein the method comprises providing a rectangular top portion operable to cover a rectangular top surface of the one section of the foldable massage table, providing a rectangular front portion operable to cover a rectangular front surface of the one section of the foldable massage table, said rectangular front portion comprising an aperture, said aperture operable to receive a handle of the foldable massage table, providing a rectangular rear portion operable to cover a rectangular rear surface of the one section of the foldable massage table, providing a rectangular left portion operable to cover a rectangular left surface of the one section of the foldable massage table, providing a rectangular right portion operable to cover a rectangular right surface of the one section of the foldable massage table, providing a rectangular rear reinforcement portion coupled with the rectangular rear portion, providing a front elastic embedded within an edge of the rectangular front portion and extending through a partial length of the rectangular front portion, and providing a rear elastic embedded within an edge of the rectangular rear portion and extending through a partial length of the rectangular rear portion, wherein the front elastic and the rear elastic operate to secure the massage table cover to the one section of the foldable massage table, and wherein the rectangular rear reinforcement portion operates to protect the rectangular rear portion.

In another aspect, a massage table cover is disclosed wherein the cover comprises a rectangular top portion, a rectangular front portion comprising an aperture, a rectangular rear portion, a rectangular left portion, a rectangular right portion, a rectangular rear reinforcement portion coupled with the rectangular rear portion, a front elastic embedded within an edge of the rectangular front portion and extending through a partial length of the rectangular front portion, and a rear elastic embedded within an edge of the rectangular rear portion and extending through a partial length of the rectangular rear portion.

Preferably, at least one of the rectangular top portion, the rectangular front portion, the rectangular rear portion, the rectangular left portion, the rectangular right portion, and the rectangular rear reinforcement portion is made from fabric.

Preferably, the aperture is rectangular.

Preferably, the rectangular rear reinforcement portion is coupled with the rectangular rear portion via stitches.

Preferably, the cover further comprises an aperture maintenance portion disposed around the aperture and coupled with the rectangular front portion, said aperture maintenance portion operable to maintain open the aperture.

Preferably, the aperture maintenance portion is made from leather.

Preferably, the cover further comprises a fastener coupled with a bottom side of the aperture maintenance portion, and a flap coupled with the top side of the aperture maintenance portion.

DETAILED DESCRIPTION OF THE PRESENTLY PREFERRED EMBODIMENTS

Figure 1:
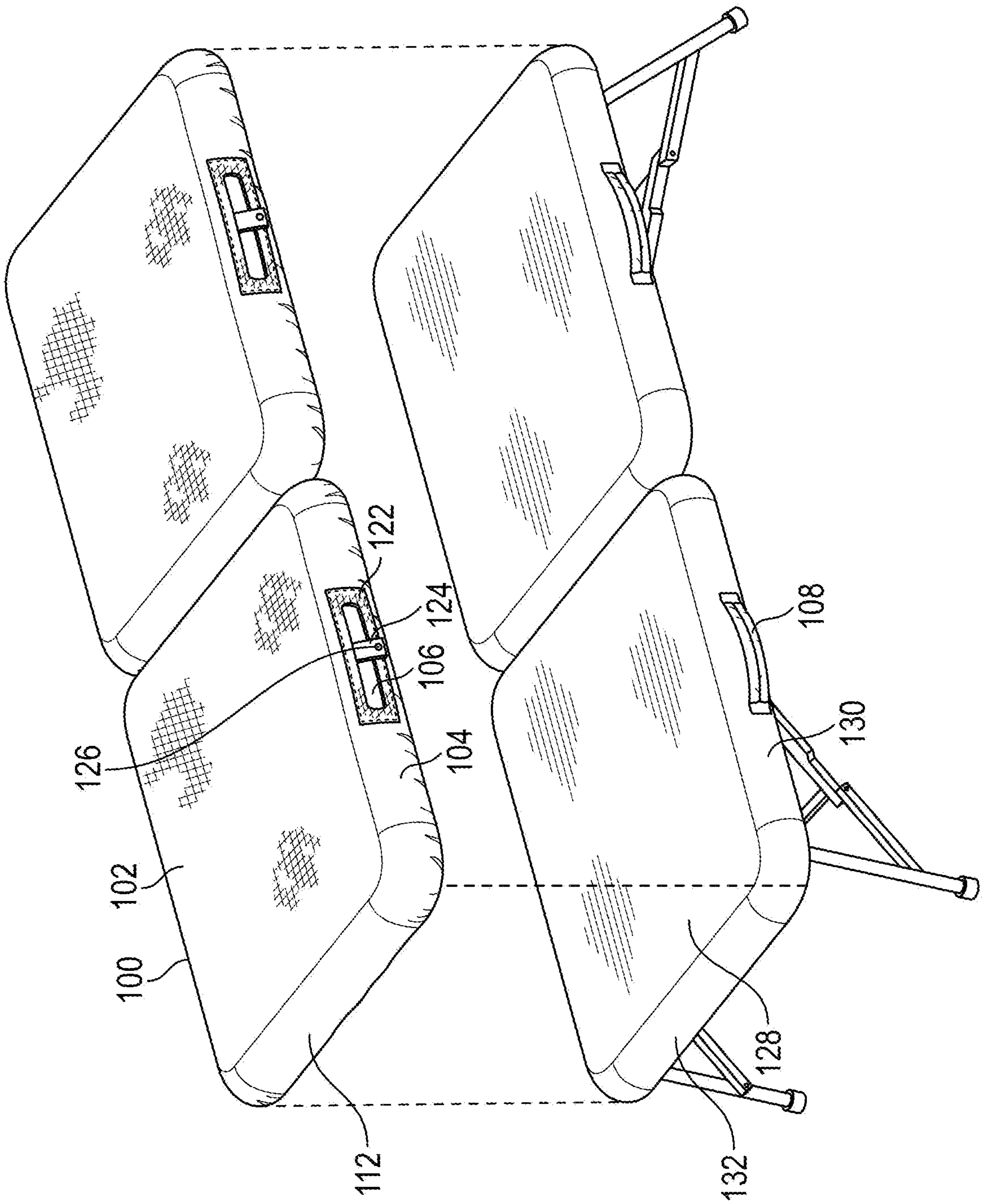
FIG. 1 shows an exploded perspective view of two massage table covers that can be used to cover the entirety of a foldable massage table according to a preferred embodiment. One cover covers one section and the other covers the other section of the foldable massage table.

FIG. 1 depicts an exploded perspective view of two massage table covers that can be used to cover the entirety of a foldable massage table according to a preferred embodiment. One of the massage table covers 100 covers one section of the foldable massage table. The massage table cover 100 comprises a rectangular top portion 102 which operates to cover a rectangular top surface 128 of the one section of the foldable massage table. The cover 100 further comprises a rectangular front portion 104 which operates to cover a rectangular front surface 130 of the one section of the foldable massage table. The front portion 104 further comprises an aperture 106 which operates to receive a handle 108 of the foldable massage table. The cover 100 further comprises a rectangular rear portion (not visible in this figure but see FIG. 2 item 110) which operates to cover a rectangular rear surface (not visible in this figure) of the one section of the foldable massage table. The cover 100 further comprises a rectangular left portion 112 which operates to cover a rectangular left surface 132 of the one section of the foldable massage table. The cover 100 further comprises a rectangular right portion (not visible in this figure but see FIG. 2 item 114) which operates to cover a rectangular right surface (not visible in this figure) of the one section of the foldable massage table. The cover 100 further comprises a rectangular rear reinforcement portion (not visible in this figure but see FIG. 2 item 116) coupled with the rectangular rear portion 110.

The cover 100 further comprises a front elastic (not visible in this figure but see FIG. 2 item 118) embedded within an edge of the rectangular front portion 104. The front elastic 118 may extend through a partial length of the rectangular front portion 104. The cover 100 further comprises a rear elastic (not visible in this figure but see FIG. 2 item 120) embedded within an edge of the rectangular rear portion 110. The rear elastic 120 may extend through a partial length of the rectangular rear portion 110. The front elastic 118 and the rear elastic 120 operate to secure the massage table cover 100 to the one section of the foldable massage table. Furthermore, the rectangular rear reinforcement portion 116 operates to protect the rectangular rear portion 110.

The cover 100 can be made from different materials such as fabric, nylon, or leather. According to a preferred embodiment, the rectangular top portion 102, the rectangular front portion 104, the rectangular rear portion 110, the rectangular left portion 112, the rectangular right portion 114, and the rectangular rear reinforcement portion 116 are made from fabric.

The rectangular front portion 104 further comprises an aperture 106 which operates to receive a handle 108 of the foldable massage table. The aperture 106 can be of different shapes, such as rectangular, square, or elliptical. In this preferred embodiment, the aperture 106 is rectangular.

The cover 100 further comprises an aperture maintenance portion 122 which is disposed around the aperture 106 and coupled with the rectangular front portion 104. The aperture maintenance portion 122 operates to maintain open the aperture 106.

The aperture maintenance portion 122 can be of different shapes, such as rectangular, square, or elliptical, and made from different materials such as fabric, nylon, or leather. According to this preferred embodiment the aperture maintenance portion 122 is rectangular and made from leather. Furthermore, the aperture maintenance portion 122 can be coupled with the rectangular front portion 104 by different means. According to a preferred embodiment, the aperture maintenance portion 122 is coupled with the rectangular front portion 104 via stitches.

The cover 100 further comprises a fastener 126 which is coupled with a bottom side of the aperture maintenance portion 122 and a flap 124 which is coupled with a top side of the aperture maintenance portion 122. The flap 124 slides under the handle 108 and engages the fastener 126 further securing the cover 100 to one section of the foldable massage table. The fastener 126 may be a button, a Velcro strap, or a snap button.

Figure 2:
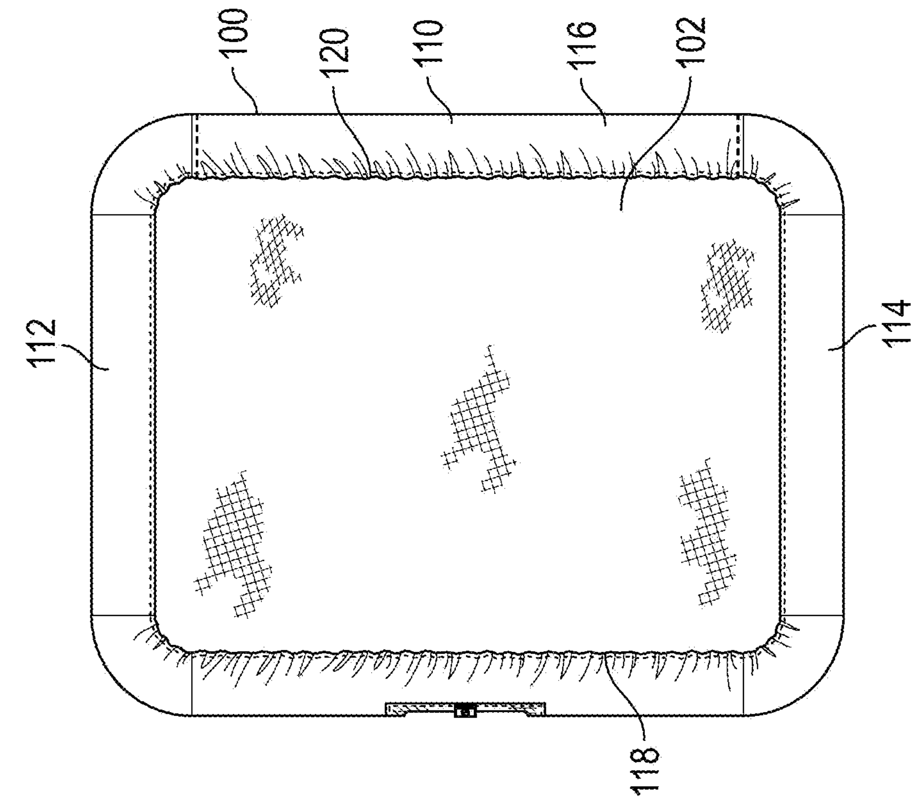
FIG. 2 shows a bottom view of one of the massage table covers shown in FIG. 1.

FIG. 2 depicts a bottom view of the cover 100 cover shown in FIG. 1. In this embodiment, the front elastic 118 extends through a partial length of the rectangular left portion 112 and further along an entire length of the rectangular front portion 104 and further along a partial length of the rectangular right portion 114. The rear elastic 120 extends through a partial length of the rectangular left portion 112 and further along an entire length of the rectangular rear portion 110 and further along a partial length of the rectangular right portion 114. The rectangular rear reinforcement portion 116 is coupled with the rectangular rear portion 110 via stitches.

Figure 3:
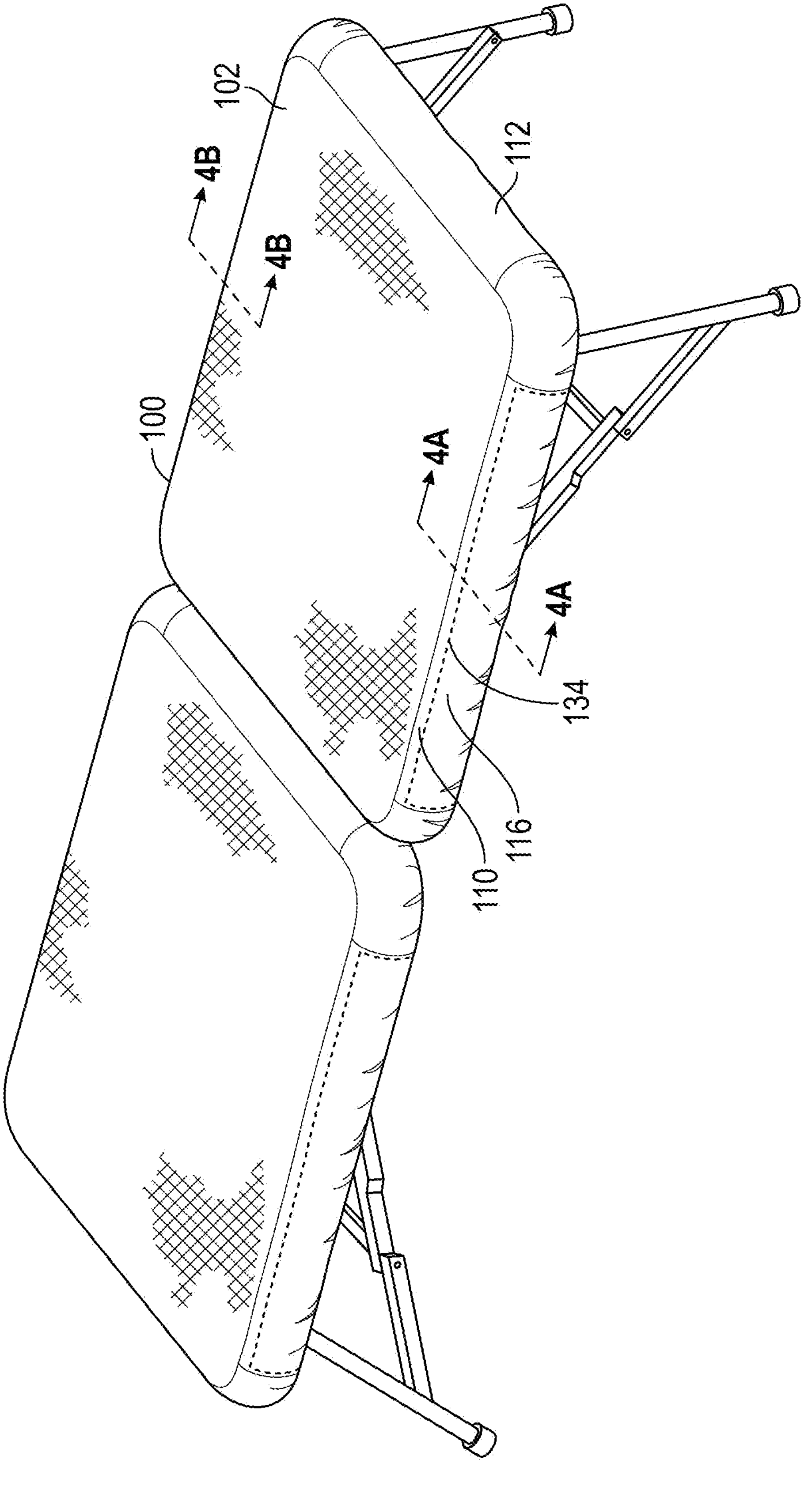
FIG. 3 shows a perspective view of the two massage table covers shown in FIG. 1 when secured to the foldable massage table.

FIG. 3 depicts a perspective view of the two massage table covers shown in FIG. 1 when secured to the foldable massage table. Specifically, in this figure, the cover 100 is placed on one section of the foldable massage table. It is secured to the table via the front elastic 118 and the rear elastic 120. The rectangular rear reinforcement portion 116 is coupled with the rectangular rear portion 110 via stitches 134.

Figure 4B:
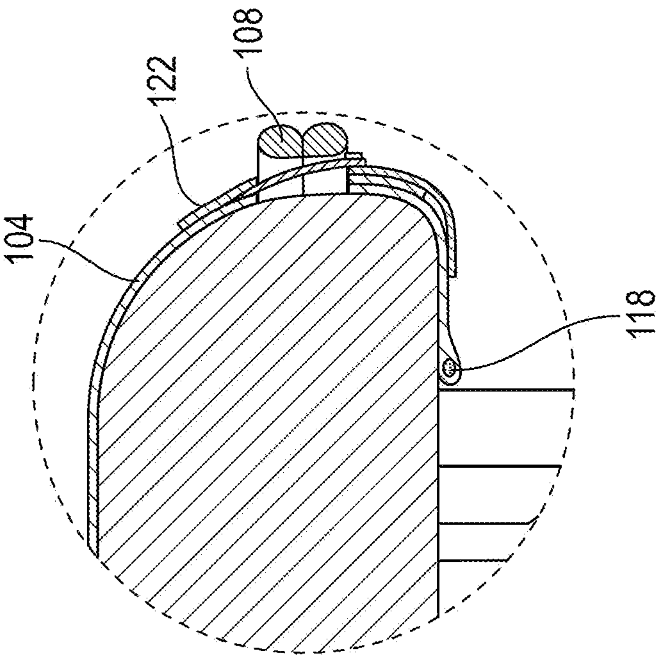
FIG. 4B shows a partial cross-sectional view of the rectangular front portion of the massage table cover shown in FIG. 1.
Figure 4A:
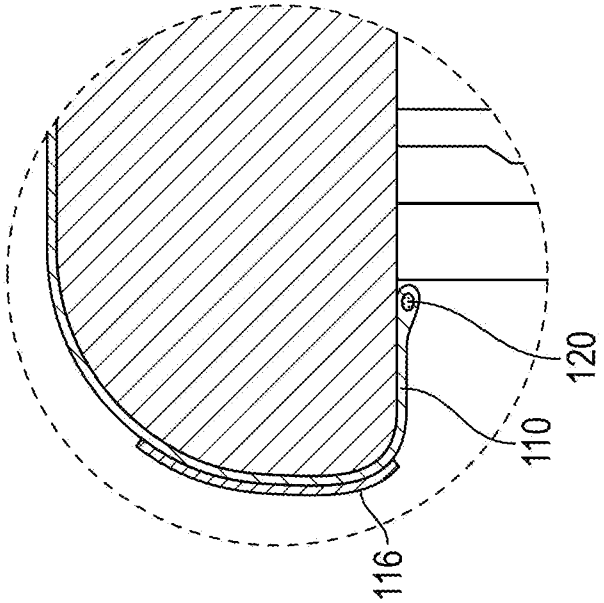
FIG. 4A shows a partial cross-sectional view of the rectangular rear portion of the massage table cover shown in FIG. 1.

FIGS. 4A and 4B depict a partial cross-sectional view of the rectangular rear portion 110 and a partial cross-sectional view of the rectangular front portion 104, respectively, of the massage table cover 100 shown in FIG. 1. In particular, FIG. 4A depicts the manner by which the cover 100 is secured to the foldable massage table via the rear elastic 120. As described above, the cover 100 also includes the rectangular rear reinforcement portion 116 which is coupled with the rectangular rear portion 110 via stitches 134. The rear elastic 120 may only extend through a partial length of the rectangular rear portion 110 or, alternatively, may cover the entire length of the rectangular rear portion 110 plus partial lengths of the rectangular left portion 112 and the rectangular right portion 114.

FIG. 4B depicts the manner by which the cover 100 is further secured to the foldable massage table via the front elastic 118. As described above, the rectangular front portion 104 further comprises the aperture 106 which operates to receive the handle 108 of the foldable massage table. In addition, the cover 100 further comprises the aperture maintenance portion 122 which is disposed around the aperture 106 and coupled with the rectangular front portion 104. The handle 108 protrudes out of the aperture 106 for the user to fold or, otherwise, carry the foldable massage table when in a folded condition, while the cover 100 is secured to the table and remains so secured. The front elastic 118 may only extend through a partial length of the rectangular front portion 104 or, alternatively, may cover the entire length of the rectangular front portion 104 plus partial lengths of the rectangular left portion 112 and the rectangular right portion 114. The aperture maintenance portion 122 operates to maintain the aperture 106 open and accessible to the handle 108.

Figure 5:
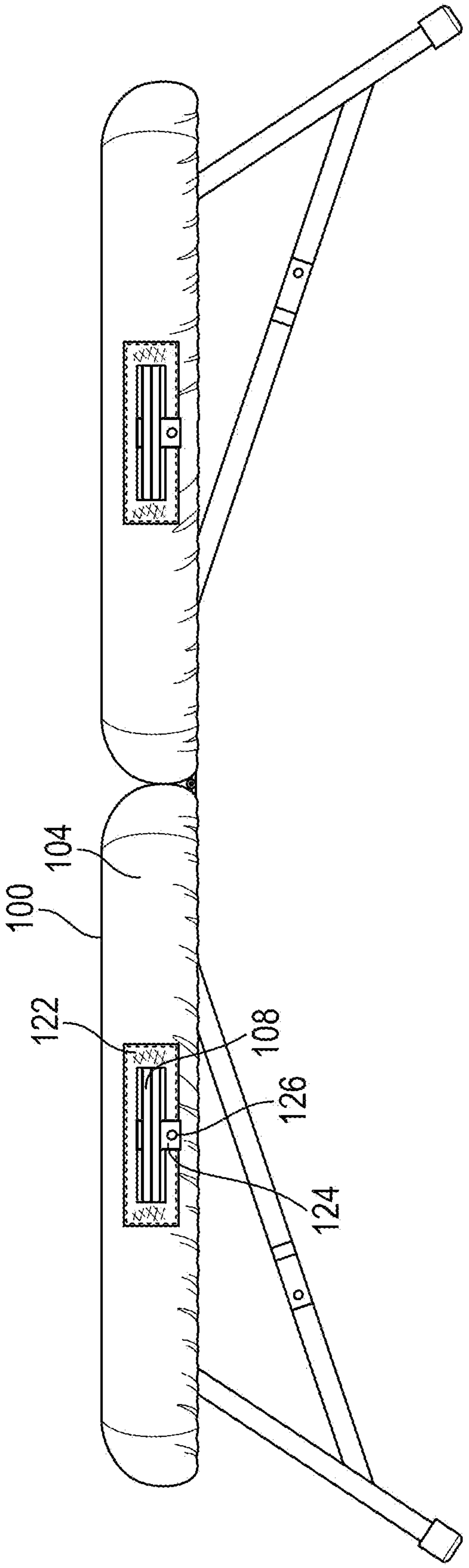
FIG. 5 shows a front view of the foldable massage table covered with two massage table covers shown in FIG. 1.

FIG. 5 depicts a front view of the two massage table covers shown in FIG. 1 when secured to the foldable massage table. Specifically, in this figure, the cover 100 is placed on one section of the foldable massage table. It is secured to the table via the front elastic 118 and the rear elastic 120. The aperture maintenance portion 122 is disposed around the aperture 106 and includes the fastener 126 and the flap 124. The handle 108 is received by the aperture 106, the flap 124 is slidably disposed under the handle 108 and operates to engage the fastener 126 to further secure the cover 100 to the one section of the foldable massage table.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A massage table cover comprising:

(a) a rectangular top portion;

(b) a rectangular front portion comprising an aperture;

(c) a rectangular rear portion;

(d) a rectangular left portion;

(e) a rectangular right portion;

(f) a rectangular rear reinforcement portion coupled with the rectangular rear portion;

(g) a front elastic embedded within an edge of the rectangular front portion and extending through a partial length of the rectangular front portion;

(h) a rear elastic embedded within an edge of the rectangular rear portion and extending through a partial length of the rectangular rear portion;

(i) an aperture maintenance portion disposed around the aperture and coupled with the rectangular front portion, said aperture maintenance portion operable to maintain open the aperture;

(j) a fastener coupled with a bottom side of the aperture maintenance portion; and (k) a flap coupled with the top side of the aperture maintenance portion.

2. The massage table cover of claim 1, wherein at least one of the rectangular top portion, the rectangular front portion, the rectangular rear portion, the rectangular left portion, the rectangular right portion, and the rectangular rear reinforcement portion is made from fabric.

3. The massage table cover of claim 1, wherein the aperture is rectangular.

4. The massage table cover of claim 1, wherein the rectangular rear reinforcement portion is coupled with the rectangular rear portion via stitches.

5. The massage table cover of claim 1, wherein the aperture maintenance portion is made from leather.

6. The massage table cover of claim 1, wherein at least one of the front elastic and the rear elastic is made from rubber.

7. The massage table cover of claim 1, wherein the front elastic extends through a partial length of the rectangular left portion and further along an entire length of the rectangular front portion and further along a partial length of the rectangular right portion, and wherein the rear elastic extends through a partial length of the rectangular left portion and further along an entire length of the rectangular rear portion and further along a partial length of the rectangular right portion.

8. The massage table cover of claim 1, wherein the aperture maintenance portion is rectangular.

9. The massage table cover of claim 1, wherein the aperture maintenance portion is coupled with the rectangular front portion via stitches.

10. The massage table cover of claim 1, wherein the fastener is one of a button, a Velcro strap, and a snap button.

11. A method of covering a massage table, comprising:

(a) providing a rectangular top portion;

(b) providing a rectangular front portion comprising an aperture;

(c) providing a rectangular rear portion;

(d) providing a rectangular left portion;

(e) providing a rectangular right portion;

(f) providing a rectangular rear reinforcement portion coupled with the rectangular rear portion;

(g) providing a front elastic embedded within an edge of the rectangular front portion and extending through a partial length of the rectangular front portion;

(h) providing a rear elastic embedded within an edge of the rectangular rear portion and extending through a partial length of the rectangular rear portion;

(i) providing an aperture maintenance portion disposed around the aperture and coupled with the rectangular front portion, said aperture maintenance portion operable to maintain open the aperture;

(j) providing a fastener coupled with a bottom side of the aperture maintenance portion; and (k) providing a flap coupled with the top side of the aperture maintenance portion.

* * * * *